United States Patent

[19]

Shimizu

[11] 4,092,615
[45] May 30, 1978

[54] METHOD OF AND APPARATUS FOR STABILIZING OUTPUT LIGHT OF A CURRENT MODULATION LASER DEVICE WHOSE OUTPUT IS CHANGED BY CHANGING AN ANODE CURRENT

[75] Inventor: Akira Shimizu, Hachioji, Japan

[73] Assignee: Olympus Optical Company Limited, Tokyo, Japan

[21] Appl. No.: 786,049

[22] Filed: Apr. 8, 1977

Related U.S. Application Data

[63] Continuation of Ser. No. 633,162, Nov. 18, 1975, abandoned.

[30] Foreign Application Priority Data

Nov. 25, 1974  Japan .................................. 49-135391

[51] Int. Cl.² ............................................. H01S 3/13
[52] U.S. Cl. ........................................... 331/94.5 S
[58] Field of Search .................................. 331/94.5 S

[56] References Cited

U.S. PATENT DOCUMENTS 3,633,124  1/1972  Danielmeyer .................... 331/94.5 S
3,689,851  9/1972  Corcoran et al. ................ 331/94.5 S

*Primary Examiner*—William L. Sikes
*Attorney, Agent, or Firm*—Haseltine, Lake & Waters

[57] ABSTRACT

A method of stabilizing output light of a current modulation laser device whose output light is changed by changing an anode current is disclosed. The method comprises detecting a part of a laser output light and converting that part of the laser output light which is detected into an electric signal, comparing said electric signal with a modulating input signal to obtain an analog signal corresponding to a difference between said two signals, controlling a gain of said modulating input signal by means of said analog signal, and feeding back said gain controlled modulating input signal to an input terminal of a laser device. An apparatus for carrying out the method comprises a partial mirror for detecting a part of said laser output light, a photodiode for converting that part of said laser output light which is detected into said electric signal, a comparison circuit connected to both said photodiode and an input terminal for receiving a modulating input signal and for comparing said electric signal with said modulating input signal to obtain said analog signal corresponding to a difference between said two signals, and a gain control circuit connected between said input terminal and the output of said comparison circuit and for controlling a gain of said modulating input signal by means of said analog signal.

2 Claims, 7 Drawing Figures

FIG._4

METHOD OF AND APPARATUS FOR STABILIZING OUTPUT LIGHT OF A CURRENT MODULATION LASER DEVICE WHOSE OUTPUT IS CHANGED BY CHANGING AN ANODE CURRENT

The present application is a continuation of the parent application Ser. No. 633,162 filed Nov. 18, 1975 now abandoned.

This invention relates to a method of and apparatus for stabilizing output light of a current modulation laser device whose output light is changed by changing an anode current.

Such kind of current modulation laser device requires no optical modulation system for the purpose of changing the intensity of the laser output light; is extremely simple in construction and can easily and reliably be operated; provides a material increase in the amount of light and life if compared with a crater lamp which has been used in phototelegraphy such as facsimile and the like; and can be applied to such kind of practical fields.

The above mentioned current modulation laser device, however, has a number of disadvantages. In the first place, thermal expansion and contraction, strain as well as change of gas pressure and mechanical oscillations and the like of a laser tube cause the laser output light to change. That is, even though the modulating input is made constant, the laser output light becomes changed. Secondly, in the case of current modulation the laser output light is changed in response to the average value of the modulating input signals. Finally, when the current modulation laser device is applied to a fascimile receiver and the like, light and dark of a picture image are changed to prevent a high fidelity reproduction of the picture image.

An object of the invention is to provide a method of and apparatus for stabilizing output light of a current modulation laser device which can obviate the above mentioned disadvantages of the existing laser device, and can emit a laser output light which is always proportional to a modulating input irrespective of changes in modulating inputs and without being subjected to influence of thermal expansion and contraction, strain, change in gas pressure and mechanical vibrations and the like of a laser tube.

A feature of the invention is the provision of a method of stabilizing output light of a current modulation laser device whose output is changed by changing an anode current, comprising detecting a part of a laser output light and converting that part of the laser output light which is detected into an electric signal, comparing said electric signal with a modulating input signal to obtain an analog signal corresponding to a difference between said two signals, controlling a gain of said modulating input signal by means of said analog signal, and feeding back said gain controlled modulating input signal to an input terminal of a laser device, whereby the output light of said laser device is made proportional to said modulating current.

Another feature of the invention is the provision of an apparatus for stabilizing output light of a current modulation laser device whose output is changed by changing an anode current, comprising a laser device having an input terminal, a detector including a partial mirror for reflecting a part of a laser output light and a photodiode for converting that part of the laser output light which is reflected by said partial mirror into an electric signal, a comparison circuit connected to both said photodiode and an input terminal for receiving a modulating input signal and for comparing said electric signal with said modulating input signal to obtain an analog signal corresponding to a difference between said two signals, and a gain control circuit connected between said input terminal and the output of said comparison circuit and for controlling a gain of said modulating input signal by means of said analog signal, whereby the output light of said laser device is made proportional to said modulating input signal.

The invention will now be described in greater detail with reference to the accompanying drawings, wherein.

Figure 1:
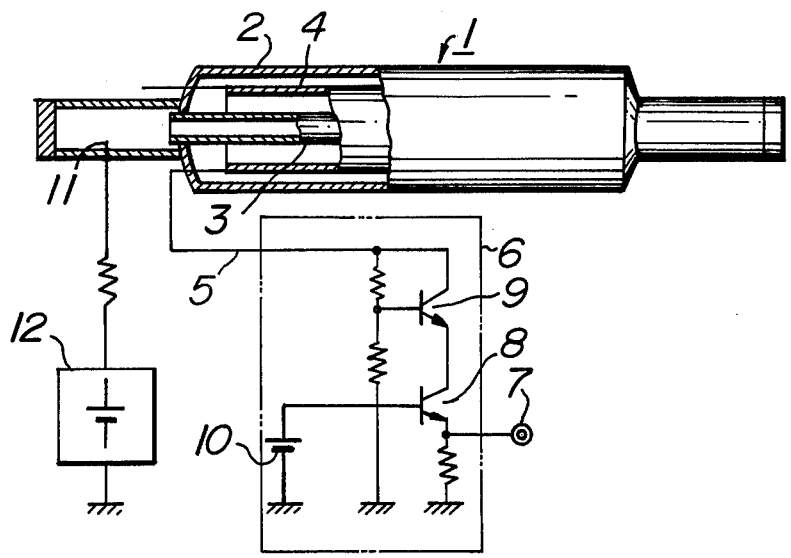
FIG. 1 is a front elevation partly in section, of a laser device and a circuit diagram of related circuit elements of the apparatus according to the invention.

In FIG. 1 is diagrammatically shown a current modulation laser device. A laser tube 1 comprised of an outer tube 2 and an inner tube 3 concentrically arranged with each other. Between the outer tube 2 and the inner tube 3 is arranged a cathode 4 formed of a metal cylinder. The cathode cylinder 4 is connected through a conductor 5 to a current modulation circuit, i.e., a driver circuit 6. The driver circuit 6 is provided with an input terminal 7 for receiving a modulating input signal, for example, a facsimile signal, and comprised of transistors 8 and 9, and a source of bias D.C. current 10. The laser tube 1 is further provided with an anode 11 connected to a source of laser D.C. current 12.

The driver circuit 6 may be connected through the conductor 5 to the anode 11.

The transistors 8 and 9 are made normally conductive so that a discharge current flows even in the absence of the modulating input signal.

If the modulating input signal is supplied to the input terminal 7, the discharge current flowing through the transistors 8 and 9 is modulated in response to the modulating input signal, and as a result, the anode current of the laser tube 1 is modulated.

In the embodiment shown in FIG. 1, if the modulating input signal supplied to the input terminal 7 is increased, the anode current of the laser tube 1 becomes decreased and hence the laser output light becomes increased. That is, the laser output light is modulated in response to the modulating input signal supplied to the input terminal 7.

Figure 2:
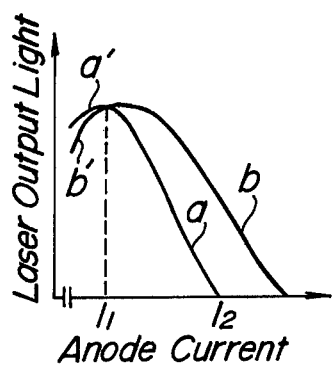
FIG. 2 is a graph which illustrates anode current versus laser output light characteristic curves.

In FIG. 2 is shown a graph which illustrates the above mentioned relation between the anode current and the laser output light. As shown in FIG. 2 the laser output light reaches to its maximum value at an anode current $I_1$. If the anode current is increased, the laser output light becomes decreased until it reaches to a value $I_2$ where the laser output light is zero. The laser output light remains zero even though the anode current exceeds the value $I_2$. In the range from $I_1$ to $I_2$ of the anode current, there exists a rectilinear relation between the anode current and the laser output light. As a result, a facsimile signal inclusive of a half tone may be supplied to the input terminal 7. It is a matter of course that a facsimile signal inclusive of black and white may also be supplied to the input terminal 7.

Alternatively, the anode current may be decreased from its maximum value $I_1$ as shown by $b'$ so as to decrease the laser output light.

In the above described current modulation laser device, the anode current versus laser output light characteristics are changed in response to the average value of the modulating input signal supplied to the input terminal 7 and hence to the average value of the anode current.

In FIG. 2 a curve a shows the anode current whose average value is small, while a curve b shows the anode current whose average value is large. As a result, the laser output light is changed in response to the average value of the modulating input signals supplied to the input terminal 7.

In addition, the laser output light is changed in response to expansion and contraction, strain as well as change in gas pressure of the outer and inner tubes 2 and 3 due to heat subjected thereto and in response to mechanical oscillations of the outer and inner tubes 2 and 3.

Figure 3:
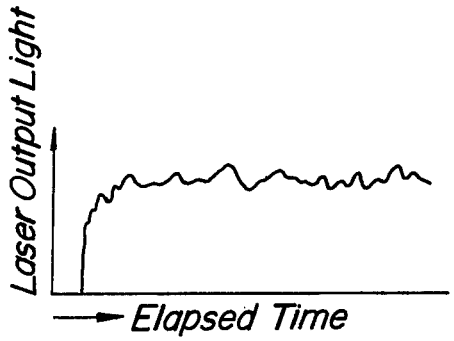
FIG. 3 is a graph which illustrates an elapsed time versus laser output light curve.

In FIG. 3 is shown a curve which illustrates change of the laser output light with the lapse of time when the modulating input signal supplied to the input terminal 7 is given. As seen from FIG. 3, the laser output light is changed in an irregular manner with the lapse of time. Such change of the laser output light reaches to large values which are equal to (¼) to (1/5) times larger than that laser output light which is emitted when the average value of the given modulating input signal is supplied to the input terminal 7.

The invention relates to a method and apparatus whereby the change of the laser output light in response to the change of average value of the modulating input signal and the change of the laser output light with the lapse of time are effectively prevented so as to always obtain the laser output light which is proportional to the modulating input signal or the anode current.

Figure 4:
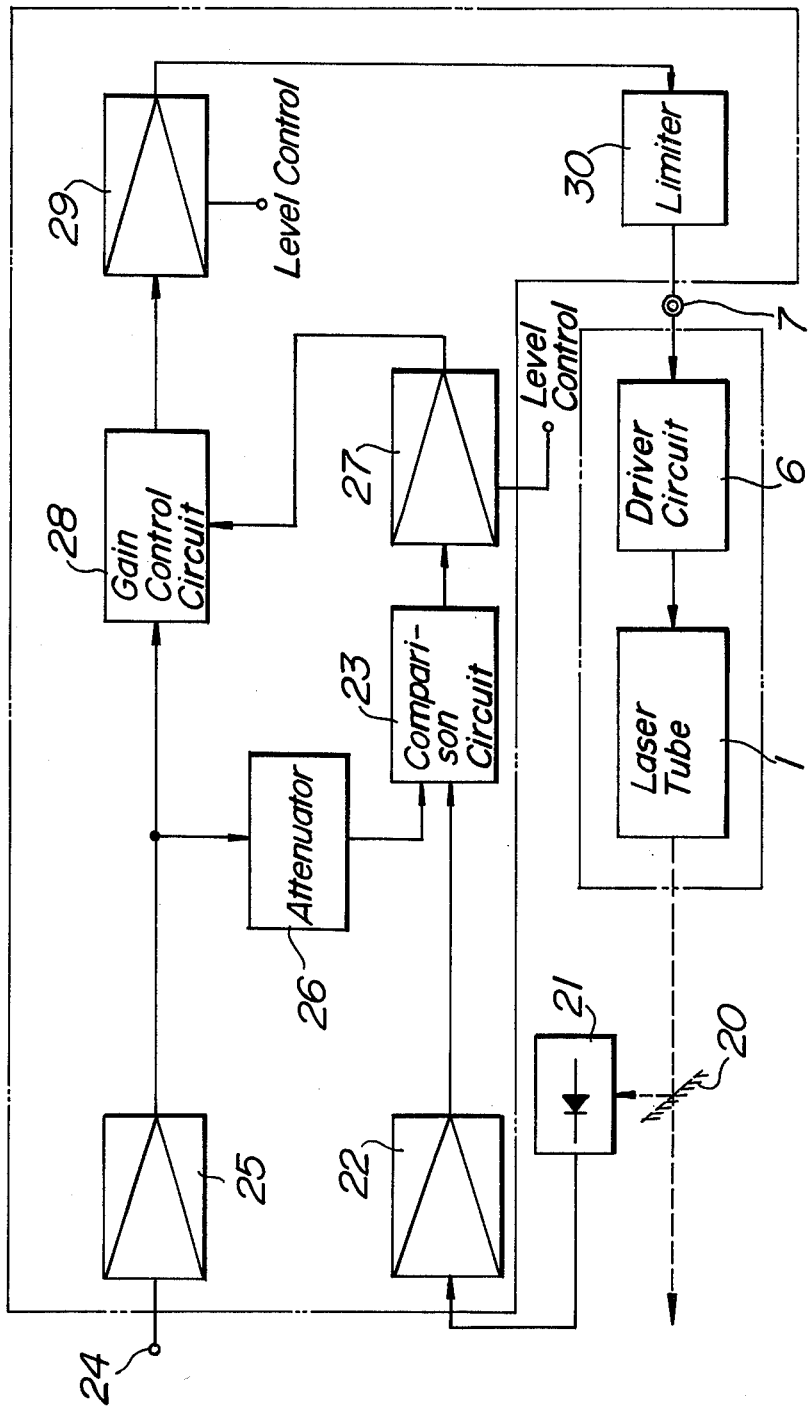
FIG. 4 is a block diagram that may be employed to practice the apparatus according to the present invention.

In FIG. 4 is shown a block diagram showing one embodiment of the apparatus according to the invention.

In the embodiment shown in FIG. 4, a part of the laser output light emitted from the laser tube 1 is reflected by a partial mirror 20 toward a light detector 21, for example, a photodiode and the like to convert the reflected light into an electric signal. The output signal from the light detector 21 is supplied to an amplifier 22 to obtain a signal having a suitable level. The output signal from the amplifier 22 is supplied to one of input terminals of a comparison circuit 23.

In addition, a modulating input signal received at an input terminal 24 is supplied to an amplifier 25. A signal amplified by the amplifier 25 is supplied to an attenuator 26 so as to suitably attenuate the gain of the amplified signal from the amplifier 25. The signal thus attenuated is supplied to another input terminal of the comparison circuit 23.

The comparison circuit 23 is constituted by, for example, a differential amplifier in which a difference between the laser output light and the modulating input signal is converted into an analog signal. The analog signal is supplied through an amplifier 27 to a control terminal of a gain control circuit 28.

The modulating input signal received at the input terminal 24 is also supplied through the amplifier 25 to the gain control circuit 28 in which the gain of this modulating input signal is controlled by the above mentioned difference analog signal delivered from the comparison circuit 23.

The output from the gain control circuit 28, i.e., the modulating input signal whose gain is controlled is supplied through an amplifier 29 and a limiter 30 to the input terminal 7 of the driver circuit 6 shown in FIG. 1 so as to control the anode current of the laser tube 1.

Figure 5:
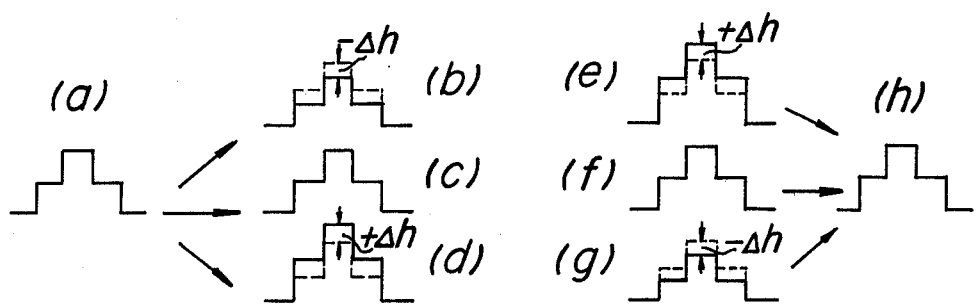
FIG. 5 are wave forms that are used in explaining the operating characteristics of the apparatus shown in FIG. 4.

If a picture signal shown in FIG. 5a, for example, is supplied as a modulating input signal to the input terminal 7 shown in FIG. 1, the laser output light becomes those shown in FIGS. 5b, 5c and 5d due to the changes produced in the laser tube 1. Let the laser output light shown in FIG. 5c be of normal output light, let the laser output light shown in FIG. 5b be of decreased output light and let the laser output light shown in FIG. 5d be of increased output light.

In accordance with the invention, these laser output lights shown in FIGS. 5b, 5c and 5d are compared with the modulating input signal supplied to the input terminal 24 in the comparison circuit 23 to obtain a difference signal $-\Delta h$ or $+\Delta h$ and this difference signal is used to control the gain of the modulating input signal in the gain control circuit 28. That is, if the laser output light becomes decreased by $-\Delta h$ as shown in FIG. 5b, the gain of the modulating input signal is increased by $+\Delta h'$ as shown in FIG. 5e, while if the laser output light becomes increased by $+\Delta h$ as shown in FIG. 5d, the gain of the modulating input signal is decreased by $-\Delta h'$ as shown in FIG. 5g.

If the modulating input signal whose gain has been controlled as above described is supplied to the input terminal 7 of the drive circuit 6, in the former case the anode current becomes decreased, while in the latter case the anode current becomes increased.

If the anode current is decreased, the laser output light becomes increased, while if the anode current is increased, the laser output light becomes decreased, as shown in FIG. 2, whereby it is possible to obtain the laser output light which is proportional to the modulating input signal shown in FIG. 5a as shown in FIG. 5h.

Figure 6:
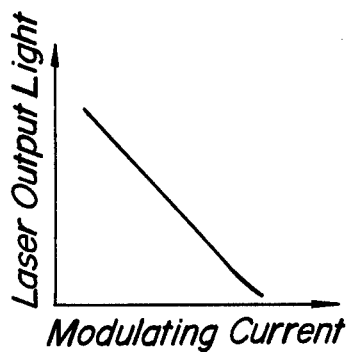
FIG. 6 is a graph which illustrates a modulating current versus laser output light curve.
Figure 7:
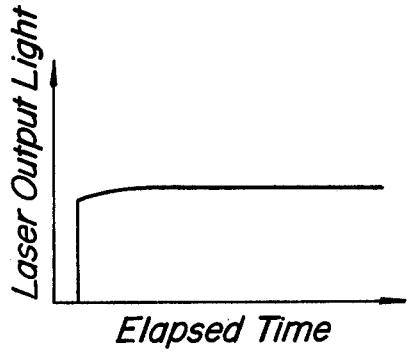
FIG. 7 is a graph which illustrates an elapsed time versus laser output light curve.

As a result, the invention is capable of stabilizing the laser output light versus the modulating current characteristic curve irrespective of the average value of the modulating input signals as shown in FIG. 6 and of making the laser output light constant throughout lapse of time with a given modulating input signal supplied to the input terminal 24 as shown in FIG. 7. As seen from FIG. 7, the change of the laser output light reaches to an extremely small value which is equal to (1/30) to (1/40) times larger than the laser output light which is emitted when the average value of the modulating input signal is applied to the input terminal 7.

In FIG. 4, the amplifier 29 plays a role of matching the modulating input signal supplied to the input terminal 24 to the laser device 1, 6. The limiter 30 restricts the modulating input signal such that there is no risk of the positive feedback being effected on the laser output characteristic curve by making the anode current significantly small and that bad influenced is not subjected to the life of the laser tube by making the anode current significantly large.

In the case of detecting a part of the laser output light so as to feedback the detected light to the laser device, it might be conceived to directly supply the output from the amplifier 27 to the input terminal 7 of the driver circuit 6. The use of such measure, however, results in a difficulty in feedback control due to the presence of a phase lag of 2 or 3 μs in the laser device per se and to the considerable amount of change in the laser output light, thereby rendering the range of controlling the feedback small. In addition, if the amount of feedback becomes large, there occurs an oscillation phenomenon of 120 to 150 KHz due to the phase lag in the laser device per se, and as a result, it is impossible to make the amount of feedback large.

On the contrary, in accordance with the invention the output signal from the comparison circuit 23 is not directly supplied to the driver circuit 6, but is supplied to the gain control circuit so as to control the gain of the modulating input signal supplied to the input signal 24. The invention, therefore, can eliminate the above mentioned difficult problem which has been encountered with other control technics.

What is claimed is:

1. A method of stabilizing output light of a current modulation laser device whose output is changed by changing an anode current, comprising detecting a part of a laser output light and converting that part of the laser output light which is detected into an electric signal, comparing said electric signal with a modulating input signal to obtain an analog signal corresponding to a difference between said two signals, controlling a gain of said modulating input signal by means of said analog signal, and feeding back said gain controlled modulating input signal to an input terminal of a laser device, whereby the output light of said laser device is made proportional to said modulating current, said input signal being a picture signal, said input signal having a random-shaped waveform, said input signal being modified by an amount opposite in direction to the amount detected in said comparing step, said current changing the laser output monotonously, said output being correspondingly variable with said input signal.

2. An apparatus for stabilizing output light of a current modulation laser device whose output is changed by changing an anode current, comprising a current modulation laser device including a direct current supply source connected to an anode for supplying discharge current to the laser, resistors connected in series with the direct current supply source and a switching transistor connected in parallel with one of the resistors, said switching transistor being controlled by an input modulating signal supplied to an input terminal so as to control an anode current within a range from a first current value at which the laser output light becomes a maximum to a second current value which is larger than said first current value, whereby the intensity of output light of the laser is modulated, a detector including a semi-reflecting mirror for reflecting a part of a laser output light and a photodiode for converting that part of the laser output light which is reflected by said semi-reflecting mirror into an electric signal, a comparison circuit connected to both said photodiode and an input terminal for receiving a modulating input signal and for comparing said electric signal with said modulating input signal to obtain an analog signal corresponding to a difference between said two signals, and a gain control circuit connected between said input terminal and the output of said comparison circuit and for controlling a gain of said modulating input signal by means of said analog signal, whereby the output light of said laser device is made proportional to said modulating input signal, said input signal being a picture signal, said input signal having a random-shaped waveform, said input signal being modified by an amount opposite in direction to the amount detected in said comparing step, said current changing the laser output monotonously, said output being correspondingly variable with said input signal.

* * * * *